United States Patent
Choi et al.

(10) Patent No.: US 10,534,091 B2
(45) Date of Patent: Jan. 14, 2020

(54) METHOD AND APPARATUS FOR GENERATING ROAD SURFACE, METHOD AND APPARATUS FOR PROCESSING POINT CLOUD DATA, COMPUTER PROGRAM, AND COMPUTER READABLE RECORDING MEDIUM

(71) Applicant: THINKWARE CORPORATION, Seongnam-si, Gyeonggi-do (KR)

(72) Inventors: Hye Sun Choi, Seongnam-si (KR); Ki Wook Lee, Seongnam-si (KR); Hye Kyung Byun, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 290 days.

(21) Appl. No.: 15/479,464

(22) Filed: Apr. 5, 2017

(65) Prior Publication Data
US 2017/0294026 A1 Oct. 12, 2017

(30) Foreign Application Priority Data
Apr. 8, 2016 (KR) ........................ 10-2016-0043401

(51) Int. Cl.
*G06T 7/60* (2017.01)
*G01S 19/42* (2010.01)
*G01S 17/89* (2006.01)
*G01S 17/02* (2006.01)

(52) U.S. Cl.
CPC ............ *G01S 19/42* (2013.01); *G01S 17/023* (2013.01); *G01S 17/89* (2013.01)

(58) Field of Classification Search
CPC ........ G01S 17/89; G01S 17/023; G01S 19/42; G01C 21/30; G01C 21/32; G06T 7/60
See application file for complete search history.

(56) References Cited

U.S. PATENT DOCUMENTS

| | | | |
|---|---|---|---|
| 9,097,804 B1 * | 8/2015 | Silver | G01S 17/936 |
| 9,719,801 B1 * | 8/2017 | Ferguson | G01C 25/00 |
| 10,151,588 B1 * | 12/2018 | Singh | G01S 17/023 |
| 2004/0158355 A1 * | 8/2004 | Holmqvist | G05D 1/0236 |
| | | | 700/245 |
| 2010/0034426 A1 * | 2/2010 | Takiguchi | G01C 21/3602 |
| | | | 382/106 |

(Continued)

OTHER PUBLICATIONS

Sensor-based control with digital maps association for gps for autonomous vehicles; Lima; 2015; (Year: 2015).*

(Continued)

*Primary Examiner* — Luis Perez-Fuentes
(74) *Attorney, Agent, or Firm* — Novick, Kim & Lee, PLLC; Sang Ho Lee

(57) ABSTRACT

Provided herein is a method for generating a road surface. The method for generating a road surface includes: obtaining a view height of a laser scanner used in an operation process through a mobile mapping system (MMS); determining a reference height on the basis of the obtained view height and a height measured by a global positioning system (GPS); extracting point cloud data positioned in a predetermined height range from the determined reference height among point cloud data obtained in the mobile mapping system; and generating the road surface on the basis of the extracted point cloud data.

17 Claims, 8 Drawing Sheets

(56) References Cited

U.S. PATENT DOCUMENTS

2015/0336546 A1* 11/2015 Al-Zahrani ............ G08G 1/165
    701/93
2017/0294026 A1* 10/2017 Choi ....................... G01S 17/42
2018/0149487 A1*  5/2018 Lee ......................... G01C 21/32

OTHER PUBLICATIONS

Road surface analysis for driving assistance; Bellone; 2014; (Year: 2014).*
Lane estimation for autonomous vehicles using vision and Lidar; Huang; 2010; (Year: 2010).*
NPL Google Search log; 2019. (Year: 2019).*

* cited by examiner

METHOD AND APPARATUS FOR GENERATING ROAD SURFACE, METHOD AND APPARATUS FOR PROCESSING POINT CLOUD DATA, COMPUTER PROGRAM, AND COMPUTER READABLE RECORDING MEDIUM

CROSS-REFERENCE TO RELATED APPLICATION

This application claims the priority and benefit of Korean Patent Application No. 10-2016-0043401 filed on Apr. 8, 2016, with the Korean Intellectual Property Office, the disclosure of which is incorporated herein by reference.

BACKGROUND OF THE INVENTION

1. Field of the Invention

The present invention relates to a method and an apparatus for generating a road surface, a method and an apparatus for processing point cloud data, a computer program, and a computer readable recording medium, and more particularly, to a method and an apparatus for generating a road surface capable of generating shape data of a three-dimensional road surface on which a moving object travels, a method and an apparatus for processing point cloud data, a computer program, and a computer readable recording medium.

2. Description of the Related Art

In order to commercialize self-driving cars, a detailed map in which road information such as three-dimensional road surfaces, lanes, stop lines, pedestrian crossings, and the like, and three-dimensional positions of road facilities such as signal lamps are represented is necessarily required.

As a typical method for constructing the detailed map, there is a method of using a mobile mapping system (MMS) for a vehicle. The mobile mapping system for a vehicle is a system simultaneously acquiring position information and image information of roads and terrain features around the roads using various sensors implemented by a global positioning system (GPS), an inertial measurement unit (IMU), a laser scanner, a digital camera, and the like, and collectively mounted in the vehicle.

Point cloud data acquired by the laser scanner of the mobile mapping system for a vehicle are a set of many points having a three-dimensional space coordinate (that is, x, y, and z information of the real world).

Here, the point cloud data are precise data capable of modeling reality, but need to be processed depending on purposes in order to construct the detailed map that becomes meaningful information in driving the vehicle.

That is, the detailed map for the self-driving cars is based on a shape of a three-dimensional road surface, and the point cloud data acquired by the laser scanner of the mobile mapping system for a vehicle includes a plurality of pieces of unnecessary information such as buildings, facilities, parked vehicles, moving vehicles, and the like, unrelated to road surface information, such that difficult filtering technology for acquiring meaningful information is required.

However, in the related art, a restrictive method such as a method for minimizing noise of original data acquired by operating the mobile mapping system only during the night in which appearance frequencies of things and vehicles are low, a method for manually extracting a road surface, or the like, due to a limitation of the filtering technology has been used.

In addition, a filtering method of using a fixed threshold value has been used. However, in such a method, an environment at the time of performing photographing is not considered, such that an error is present.

SUMMARY OF THE INVENTION

An object of the present invention is to provide a method and an apparatus for processing point cloud data capable of performing filtering on point cloud data in consideration of a view height of a laser scanner and a gradient of a road surface, a computer program, and a computer readable recording medium.

Another object of the present invention is to provide a method and an apparatus for generating a road surface capable of performing filtering on point cloud data in consideration of a view height of a laser scanner and a gradient of a road surface and generating a three-dimensional road surface on the basis of the point cloud data depending on the filtering, a computer program, and a computer readable recording medium.

According to an exemplary embodiment of the present invention, a method for generating a road surface may include: obtaining a view height of a laser scanner used in an operation process through a mobile mapping system (MMS); determining a reference height on the basis of the obtained view height and a height measured by a global positioning system (GPS); extracting point cloud data positioned in a predetermined height range from the determined reference height among point cloud data obtained in the mobile mapping system; and generating the road surface on the basis of the extracted point cloud data.

The view height of the laser scanner may be a value obtained by adding up a height of a moving object in which the mobile mapping system is installed and a height of the laser scanner.

The obtaining of the view height of the laser scanner may include receiving at least one of the height of the moving object in which the mobile mapping system is installed and the height of the laser scanner input from a user.

The method for generating a road surface may further include obtaining a GPS logarithm including GPS position information of a moving object used in the operation process through the mobile mapping system.

In the determining of the reference height, the reference height may be determined on the basis of a difference between the obtained view height and a height measured on the basis of the GPS logarithm.

The extracting of the point cloud data may include: determining a size of a window for filtering the point cloud data; determining a height threshold value on the basis of the determined size of the window; determining a first height range based on the reference height on the basis of the determined height threshold value; forming a first window having the determined size; and extracting point cloud data positioned in a first region formed by the first window and the first height range among the point cloud data obtained in the mobile mapping system.

In the determining of the size of the window, the size of the window may be determined on the basis of an accuracy level that needs to be ensured in a detailed map.

In the determining of the height threshold value, the height threshold value may be determined on the basis of a numerical value of a superelevation of a road and the size of the window.

The extracting of the point cloud data may further include: setting a minimum height value of point cloud data positioned at a boundary point of the first region to a new reference height; determining a second height range based on the new reference height on the basis of the determined height threshold value; forming a second window in a direction perpendicular to a movement direction of the moving object on the basis of the first window; and extracting point cloud data positioned in a second region formed by the second window and the second height range among the point cloud data obtained in the mobile mapping system.

The generating of the road surface may include: generating a two-dimensional road surface vector using the extracted point cloud data; generating a three-dimensional road surface raster using the extracted point cloud data; and combining the two-dimensional road surface vector and the three-dimensional road surface raster with each other to generate a three-dimensional road surface vector.

In the generating of the two-dimensional road surface vector, a convex hull algorithm may be applied to x and y values of the extracted point cloud data to generate the two-dimensional road surface vector.

In the generating of the three-dimensional road surface raster, the three-dimensional road surface raster may be generated on the basis of a minimum height value of point cloud data in the window.

According to another exemplary embodiment of the present invention, a method for processing point cloud data may include: obtaining a view height of a laser scanner used in an operation process through a mobile mapping system (MMS); determining a reference height on the basis of the obtained view height and a height measured by a global positioning system (GPS); and extracting point cloud data positioned in a predetermined height range from the determined reference height among point cloud data obtained in the mobile mapping system.

According to still another exemplary embodiment of the present invention, an apparatus for generating a road surface may include: an obtaining unit obtaining a view height of a laser scanner used in an operation process through a mobile mapping system (MMS); a reference height determining unit determining a reference height on the basis of the obtained view height and a height measured by a global positioning system (GPS); a filtering unit extracting point cloud data positioned in a predetermined height range from the determined reference height among point cloud data obtained in the mobile mapping system; and a road surface generating unit generating the road surface on the basis of the extracted point cloud data.

The view height of the laser scanner may be a value obtained by adding up a height of a moving object in which the mobile mapping system is installed and a height of the laser scanner.

The obtaining unit may receive and obtain at least one of a height of a moving object in which the mobile mapping system is installed and a height of the laser scanner, input from a user.

The obtaining unit may obtain a GPS logarithm including GPS position information of a moving object used in the operation process through the mobile mapping system.

The reference height determining unit may determine the reference height on the basis of a difference between the obtained view height and a height measured on the basis of the GPS logarithm.

The filtering unit may determine a size of a window for filtering the point cloud data, determine a height threshold value on the basis of the determined size of the window, determine a first height range based on the reference height on the basis of the determined height threshold value, form a first window having the determined size, and extract point cloud data positioned in a first region formed by the first window and the first height range among the point cloud data obtained in the mobile mapping system.

The filtering unit may determine the size of the window on the basis of an accuracy level that needs to be ensured in a detailed map.

The filtering unit may determine the height threshold value on the basis of a numerical value of a superelevation of a road and the size of the window.

The filtering unit may set a minimum height value of point cloud data positioned at a boundary point of the first region to a new reference height, determine a second height range based on the new reference height on the basis of the determined height threshold value, form a second window in a direction perpendicular to a movement direction of the moving object on the basis of the first window, and extract point cloud data positioned in a second region formed by the second window and the second height range among the point cloud data obtained in the mobile mapping system.

The road surface generating unit may include: a two-dimensional road surface vector generating unit generating a two-dimensional road surface vector using the extracted point cloud data; a three-dimensional road surface raster generating unit generating a three-dimensional road surface raster using the extracted point cloud data; and a combining unit combining the two-dimensional road surface vector and the three-dimensional road surface raster with each other to generate a three-dimensional road surface vector.

The two-dimensional road surface vector generating unit may apply a convex hull algorithm to x and y values of the extracted point cloud data to generate the two-dimensional road surface vector.

The three-dimensional road surface raster generating unit may generate the three-dimensional road surface raster on the basis of a minimum height value of point cloud data in the window.

According to yet still another exemplary embodiment of the present invention, an apparatus for processing point cloud data may include: an obtaining unit obtaining a view height of a laser scanner used in an operation process through a mobile mapping system (MMS); a reference number determining unit determining a reference height on the basis of the obtained view height and a height measured by a global positioning system (GPS); and a filtering unit extracting point cloud data positioned in a predetermined height range from the determined reference height among point cloud data obtained in the mobile mapping system.

According to yet still another exemplary embodiment of the present invention, a computer readable recording medium may record programs for executing the method for processing point cloud data and the method for generating a road surface described above therein.

The program may execute the method for processing point cloud data and the method for generating a road surface described above.

DETAILED DESCRIPTION

The following description illustrates only a principle of the present invention. Therefore, those skilled in the art may implement the principle of the present invention and invent various apparatuses included in the spirit and scope of the present invention although not clearly described or illustrated in the present specification. In addition, it is to be understood that all conditional terms and exemplary embodiments mentioned in the present specification are obviously intended only to allow those skilled in the art to understand a concept of the present invention in principle, and the present invention is not limited to exemplary embodiments and states particularly mentioned as such.

Further, it is to be understood that all detailed descriptions mentioning specific exemplary embodiments of the present invention as well as principles, aspects, and exemplary embodiments of the present invention are intended to include structural and functional equivalences thereof. Further, it is to be understood that these equivalences include an equivalence that will be developed in the future as well as an equivalence that is currently well-known, that is, all elements invented so as to perform the same function regardless of a structure.

Therefore, it is to be understood that all flow charts, state transition diagrams, pseudo-codes, and the like, illustrate various processes that may be tangibly embodied in a computer readable medium and that are executed by computers or processors regardless of whether or not the computers or the processors are clearly illustrated.

Functions of various elements including processors or functional blocks represented as concepts similar to the processors and illustrated in the accompanying drawings may be provided using hardware having capability to execute appropriate software as well as dedicated hardware. When the functions are provided by the processors, they may be provided by a single dedicated processor, a single shared processor, or a plurality of individual processors, and some of them may be shared with each other.

The above-mentioned objects, features, and advantages will become more obvious from the following detailed description associated with the accompanying drawings. Therefore, those skilled in the art to which the present invention pertains may easily practice a technical idea of the present invention. Further, in describing the present invention, in the case in which it is decided that a detailed description of a well-known technology associated with the present invention may unnecessarily make the gist of the present invention unclear, it will be omitted.

Hereinafter, various exemplary embodiments of the present invention will be described in detail with reference to the accompanying drawings.

Figure 1:
FIG. 1 is a block diagram illustrating a mobile mapping system for a vehicle according to an exemplary embodiment of the present invention.

FIG. 1 is a block diagram illustrating a mobile mapping system for a vehicle according to an exemplary embodiment of the present invention. Referring to FIG. 1, the mobile mapping system for a vehicle includes a vehicle 10 traveling on a road and a sensor 20 installed in the vehicle 10 and sensing various data for constructing a detailed map.

Here, the sensor 20 may include a position acquiring sensor acquiring a position of the road on which the vehicle travels through a global positioning system (GPS) and a posture sensor acquiring a posture of the vehicle through an inertial measurement unit (IMU).

In addition, the sensor 20 may include a camera unit attached to the vehicle 10 and photographing a road and the vicinity of the road, a distance measurement instrument (DMI), and the like. Here, the vicinity of the road may include buildings, facilities, parked vehicles, moving vehicles, and the like, unrelated to the road.

In addition, the sensor 20 may include a light detection and ranging (LiDAR) sensor, which is a kind of active remote sensing sensor acquiring desired information without directly contacting things using the same principle as that of a radar. Here, the LiDAR sensor may be implemented by a laser scanner irradiating laser beams to a target on which information is to be acquired and sensing a time difference and an energy change of electronic waves reflected and returning from the target to acquire desired information.

Such a mobile mapping system for a vehicle may store mobile mapping system (MMS) data in a storing unit, the MMS data being obtained by surveying the road and the vicinity of the road when the vehicle actually travels on the road. Here, the MMS data may include at least one of vehicle position data sensed using the global positioning system (GPS), vehicle posture data sensed using the inertial measurement unit (IMU), image data on the road and the vicinity of the road sensed using the camera unit, and point cloud data sensed using the laser scanner. Here, the point cloud data acquired by the laser scanner of the mobile mapping system for a vehicle may be a set of many points having a three-dimensional space coordinate (that is, x, y, and z information of the real world).

In this case, an apparatus for processing point cloud data according to an exemplary embodiment of the present invention may perform filtering on the point cloud data obtained in the mobile mapping system. In addition, an apparatus for generating a road surface according to an exemplary embodiment of the present invention may perform filtering on the point cloud data obtained in the mobile mapping system and generate a three-dimensional road surface on the basis of the point cloud data extracted depending on the filtering. Such an apparatus for processing point cloud data and such an apparatus for generating a road surface will be described in more detail with reference to FIGS. 2 and 3.

Meanwhile, according to the example described above, the mobile mapping system for a vehicle has been described by way of example, but a kind of moving object is not limited to the vehicle. As an example, the moving object may be implemented by a person, an aircraft, or the like.

Figure 2:
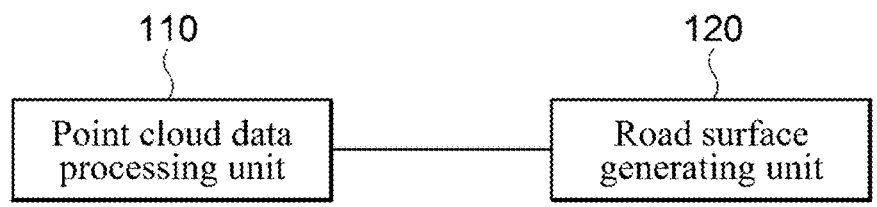
FIG. 2 is a block diagram illustrating an apparatus for generating a road surface according to an exemplary embodiment of the present invention.
Figure 3:
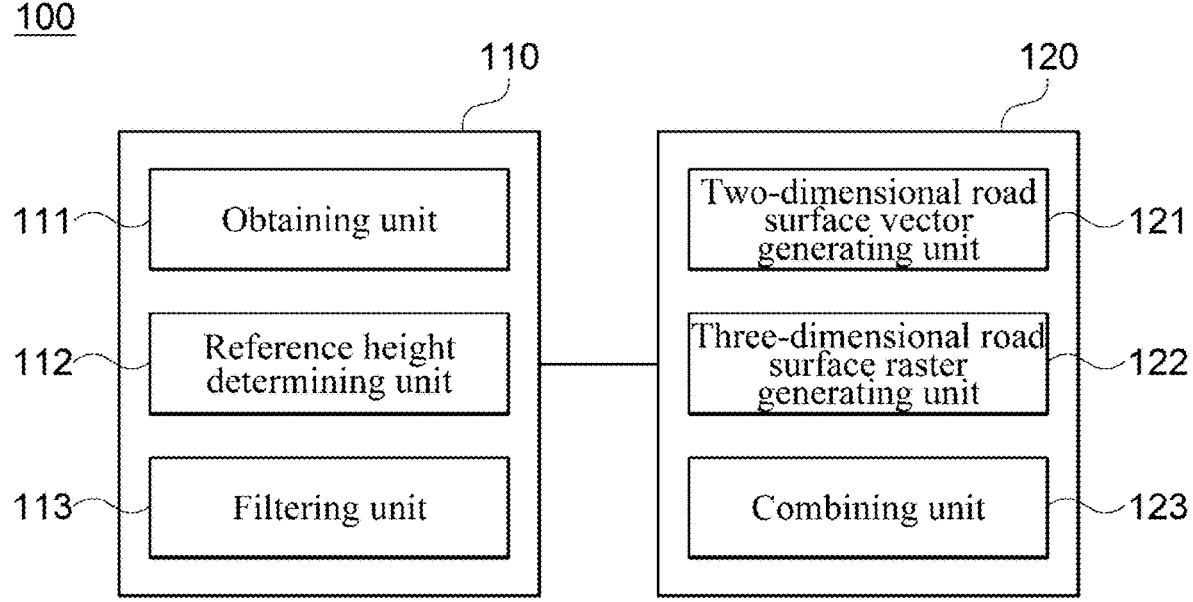
FIG. 3 is a block diagram illustrating the apparatus for generating a road surface according to an exemplary embodiment of the present invention in more detail.

FIG. 2 is a block diagram illustrating an apparatus for generating a road surface according to an exemplary embodiment of the present invention. FIG. 3 is a block diagram illustrating the apparatus for generating a road surface according to an exemplary embodiment of the present invention in more detail. Referring to FIGS. 2 and 3, the apparatus 100 for generating a road surface may include all or some of a point cloud data processing unit 110 and a road surface generating unit 120.

The point cloud data processing unit 110 may perform the filtering on the point cloud data in consideration of a view height of the laser scanner and a gradient of the road surface. Here, the point cloud data processing unit 110 may include all or some of an obtaining unit 111, a reference height determining unit 112, and a filtering unit 113.

In detail, the obtaining unit 111 may obtain a view height of the laser scanner used in an operation process through the mobile mapping system (MMS). Here, the view height of the laser scanner may be calculated by adding up a height of a moving object in which the mobile mapping system is installed and a height of the laser scanner. This will be described in detail with reference to FIG. 4.

Figure 4:
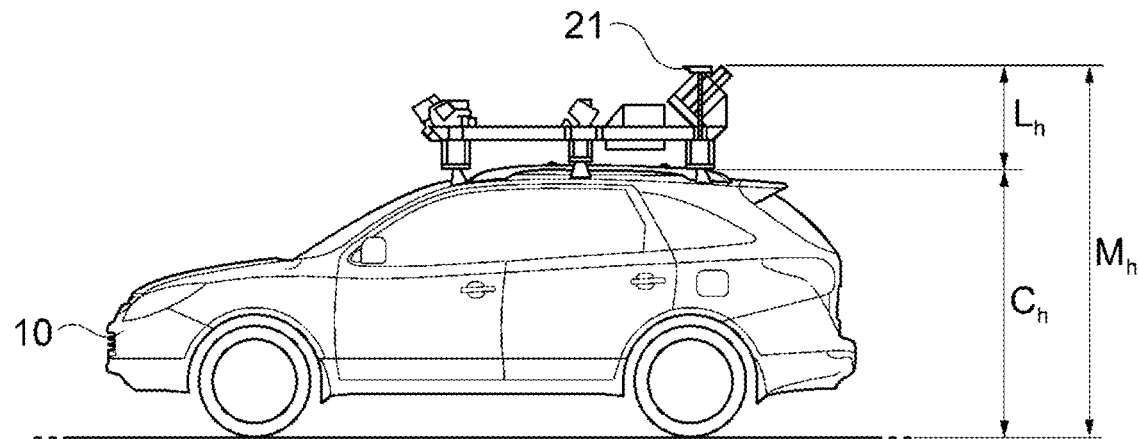
FIG. 4 is a conceptual diagram illustrating a view height of a laser scanner according to an exemplary embodiment of the present invention.

FIG. 4 is a conceptual diagram illustrating a view height of a laser scanner according to an exemplary embodiment of the present invention. Referring to FIG. 4, the mobile mapping system for a vehicle includes the vehicle 10 traveling on the road and the sensor 20 installed in the vehicle 10 and sensing various data for constructing the detailed map, and a laser scanner 21, which is one component of the sensor 20, may be installed at a predetermined position of the vehicle.

As an example, as illustrated in FIG. 4, the laser scanner 21 may be installed at an upper end of the vehicle 10 for the purpose of omni-directional scanning. Such a laser scanner 21 may irradiate laser beams toward the road and the vicinity of the road and scan electromagnetic waves reflected and returning from a target to acquire point cloud data.

In this case, a view height $M_h$ of the laser scanner 21 may be calculated by adding up a height $C_h$ of the vehicle 10 in which the mobile mapping system is installed and a height $L_h$ of the laser scanner 21, as represented by the following Equation 1.

$$M_h = C_h - L_h \qquad \text{[Equation 1]}$$

Meanwhile, such a view height $M_h$ of the laser scanner 21 may be obtained before an operation using the mobile mapping system. As an example, a user may input the height $C_h$ of the moving object in which the mobile mapping system is installed and the height $L_h$ of the laser scanner 21 before the operation using the mobile mapping system, and the mobile mapping system may calculate the view height $M_h$ of the laser scanner 21 by adding up the input height values and generate MMS data on the basis of the calculated view height $M_h$ of the laser scanner 21. In this case, the obtaining unit 111 may detect the view height $M_h$ of the laser scanner 21 from the generated MMS data.

As another example, the mobile mapping system may include a height sensing sensor sensing the view height $M_h$ of the laser scanner, and may generate MMS data on the basis of the sensed view height $M_h$ of the laser scanner. In this case, the obtaining unit 111 may detect the view height $M_h$ of the laser scanner 21 from the generated MMS data.

Alternatively, the view height $M_h$ of the laser scanner described above may be obtained after completion of the operation using the mobile mapping system and before a filtering process. As an example, the user may input the height $C_h$ of the moving object in which the mobile mapping system is installed and the height $L_h$ of the laser scanner after the completion of the operation using the mobile mapping system and before the filtering operation. In this case, the obtaining unit 111 may calculate the view height $M_h$ of the laser scanner 21 by adding up the input height $C_h$ of the moving object in which the mobile mapping system is installed and the input height $L_h$ of the laser scanner.

Meanwhile, the content described above with reference to FIG. 4 is only an example of the present invention, and in the case in which the laser scanner 21 is installed in the middle of the vehicle 10 unlike FIG. 4, the view height $M_h$ of the laser scanner 21 may be calculated by subtracting the height $L_h$ of the laser scanner 21 from the height $C_h$ of the vehicle 10 in which the mobile mapping system is installed.

Meanwhile, the obtaining unit 111 may obtain a GPS logarithm including GPS position information of the moving object used in the operation process through the mobile mapping system. The GPS logarithm may be data in which a GPS position of the moving object at the time of performing the operation using the mobile mapping system, for example, a latitude value, a longitude value, an altitude value, or the like, is recorded in a time unit. Here, the time unit may be, for example, a second unit.

The reference height determining unit 112 may determine a reference height on the basis of the obtained view height and a height measured by the GPS.

In detail, the reference height determining unit 112 may determine the reference height on the basis of a difference between the obtained view height and a height measured on the basis of the GPS logarithm. In more detail, the reference height determining unit 112 may determine the reference height $RP_h$ by subtracting the view height $M_h$ of the laser scanner from a height $GPS_z$ measured on the basis of a time unit GPS logarithm, as represented in the following Equation 2. Here, an altitude numerical value converted through national benchmark correction may be used as a height of the GPS logarithm.

$$RP_h = GPS_z - M_h \qquad \text{[Equation 2]}$$

The filtering unit 113 may extract point cloud data positioned in a predetermined height range from the determined reference height among the point cloud data obtained in the mobile mapping system.

First, the filtering unit 113 may form a first window having a predetermined size, and extract point cloud data included in the first window. Then, the filtering unit 113 may sequentially form a plurality of windows in a direction perpendicular to a movement direction of the moving object on the basis of the first window, and extract point cloud data included in the respective windows.

To this end, the filtering unit 113 may determine a size of a window for filtering. In this case, the filtering unit 113 may determine the size of the window on the basis of an accuracy level that needs to be ensured in the detailed map. In addition, the filtering unit 113 may form the first window having the determined size.

As an example, in the case in which the accuracy level that needs to be ensured in the detailed map is α, the filtering unit 113 may determine that the size of the window for filtering is α×α. The accuracy level that needs to be ensured in the detailed map is generally 10 cm, but is not limited thereto.

In addition, the filtering unit 113 may determine a height threshold value on the basis of the determined size of the window. In this case, the filtering unit 113 may determine the height threshold value $H_{offset}$ on the basis of a numerical value of a superelevation of the road and the size of the window.

As an example, according to Article 21 (Superelevation of Horizontal Curve Sections) and Article 28 (Cross Slope) of "Rules about the Road Structure & Facilities Standards" defined in the Korean Ministry of Land, Infrastructure and Transport law, it is defined that the superelevation of the road does not exceed 8%. In this case, the filtering unit 113 may determine that the height threshold value is 8% of α by reflecting the numerical value of the superelevation of the road and the size of the window.

In addition, the filtering unit 113 may determine a predetermined height range based on the reference height on the basis of the determined height threshold value $H_{offset}$. Here, the predetermined height range may be a range between a value obtained by adding the height threshold value to the reference height $RP_h$ and a value obtained by subtracting the height threshold value from the reference height $RP_h$.

In addition, the filtering unit 113 may extract point cloud data positioned in a first region formed by the first window and the predetermined height range among the point cloud data obtained in the mobile mapping system. In detail, the filtering unit 113 may extract the point cloud data positioned in the first region on the basis of the following Equation 3.

$$P_1: RP_{h(1)} - H_{offset} \leq P_{(i)h} \leq RP_{h(1)} + H_{offset}$$ [Equation 3]

Here, $P_1$ means the point cloud data positioned in the first region formed by the first window, $RP_{h(1)}$ means a reference height allocated to the first window, $H_{offset}$ means the height threshold value, and $P_{(i)h}$ means a height of the point cloud data obtained in the mobile mapping system.

Therefore, the filtering unit 113 may extract the point cloud data positioned in the first region formed by the first window having the predetermined size.

Meanwhile, when the extraction of the point cloud data positioned in the first region formed by the first window is completed, the filtering unit 113 may sequentially form the plurality of windows in a predetermined direction on the basis of the first window, and extract the point cloud data included in the respective windows. Here, the predetermined direction may be the direction perpendicular to the movement direction of the moving object. This will be described in more detail with reference to FIG. 5.

Figure 5:
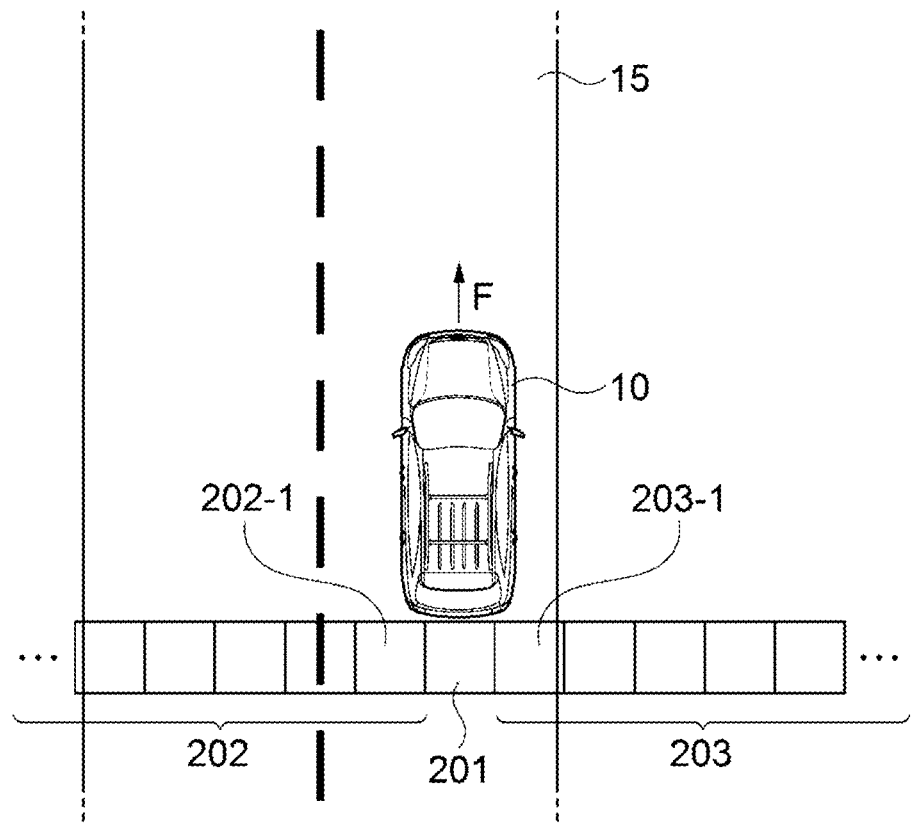
FIG. 5 is a conceptual diagram illustrating a window extension example according to an exemplary embodiment of the present invention on the basis of x and y axis.

FIG. 5 is a conceptual diagram illustrating a window extension example according to an exemplary embodiment of the present invention on the basis of x and y axis. Referring to FIG. 5, the filtering unit 113 may form a plurality of windows 202 and 203 in a direction perpendicular to a movement direction F of a moving object 10 on the basis of a first window 201.

In order to extract point cloud data corresponding to a shape of a road surface, a window covering the entire road region positioned in a width of a road 15 at a corresponding position needs to be generated.

Since the width of the road is generally defined in the direction perpendicular to the movement direction F of the moving object 10, the filtering unit 113 according to an exemplary embodiment of the present invention may form the plurality of windows 202 and 203 in the direction perpendicular to the movement direction F of the moving object 10 on the basis of the first window 201 to cover the entire road region positioned in the width of the road at the corresponding position.

Meanwhile, a reference height of each of the plurality of windows 202 and 203 may be set to a minimum height value of point cloud data positioned at a boundary position of a region formed by a window adjacent to the plurality of windows. This will be described in more detail with reference to FIG. 6.

Figure 6:
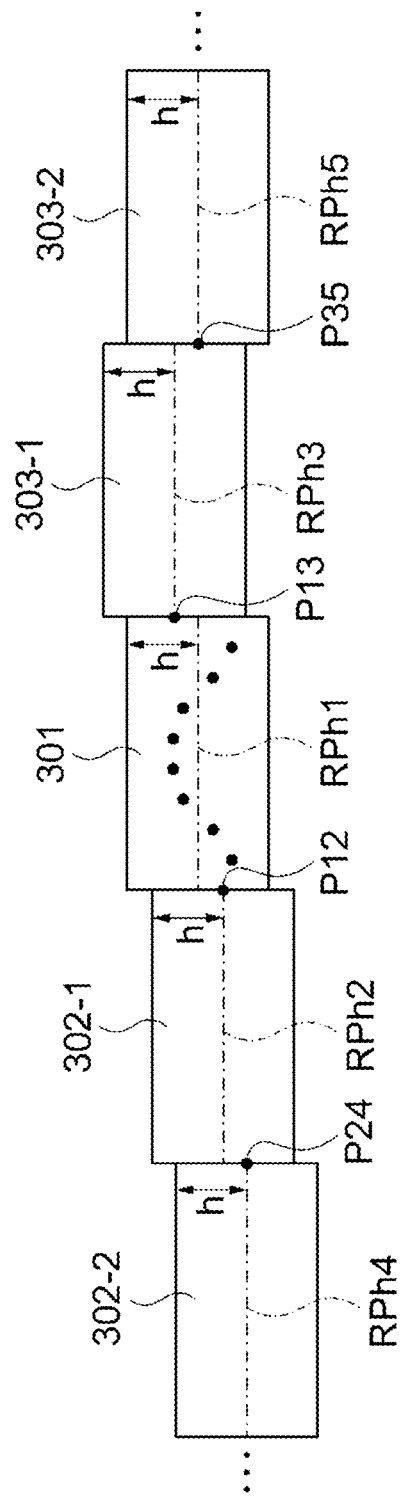
FIG. 6 is a conceptual diagram illustrating a process of setting a new reference height according to an exemplary embodiment of the present invention on the basis of a z axis.

FIG. 6 is a conceptual diagram illustrating a process of setting a new reference height according to an exemplary embodiment of the present invention on the basis of a z axis. Referring to FIG. 6, the filtering unit 113 may determine that a minimum height value of point cloud data posiOtioned at a boundary point of a first region 301 formed by the first window 201 is a new reference height for windows 202-1 and 203-1 adjacent to the first window.

In more detail, the filtering unit 113 may set a minimum height value of point cloud data P12 positioned at a boundary point, in a first direction, of the first region 301 formed by the first window 201 to a new reference height RPh2 for a second window 202-1 adjacent to the first window 201.

In addition, the filtering unit 113 may set a minimum height value of point cloud data P13 positioned at a boundary point, in a second direction, of the first region 301 to a new reference height RPh3 for a third window 203-1 adjacent to the first window 201.

In addition, the filtering unit 113 may determine a predetermined height range based on the new reference height on the basis of a determined height threshold value h. As an example, a second height range corresponding to the second window 202-1 may be a range between a height obtained by subtracting the threshold value h from the reference height PRh2 and a height obtained by adding the threshold value h to the reference height PRh2. As another example, a third height range corresponding to the third window 203-1 may be a range between a height obtained by subtracting the threshold value h from the reference height PRh3 and a height obtained by adding the threshold value h to the reference height PRh3.

In addition, the filtering unit 113 may form a second region 302-1 on the basis of the second window 202-1 and the second height range, and form a third region 303-1 on the basis of the third window 203-1 and the third height range.

In addition, the filtering unit 113 may repeatedly perform the process of setting the new reference height and the process of determining the predetermined height range described above on each of the second region 302-1 and the third region 303-1 to form a plurality of regions as illustrated in FIG. 6.

Meanwhile, the filtering unit 113 may extract point cloud data positioned in each of the plurality of regions. Therefore, point cloud data of the entire road region positioned in the width of the road may be extracted on the basis of a first position of the moving object 10.

Meanwhile, as described above, when the extraction of the point cloud data of the entire road region positioned in the width of the road on the basis of the first position of the moving object is completed, the point cloud data processing unit 110 may sequentially extract point cloud data of the entire road region positioned in the width of the road on the basis of a position of the moving object in the next time unit. As an example, the point cloud data processing unit 110 may form a first window having a predetermined size on the basis of a second position, which is the position of the moving object in the next time unit, and extract point cloud data included in the first window. Then, the filtering unit 113 may sequentially form a plurality of windows in a direction perpendicular to a movement direction of the moving object on the basis of the first window, and extract point cloud data included in the respective windows.

Figure 7:
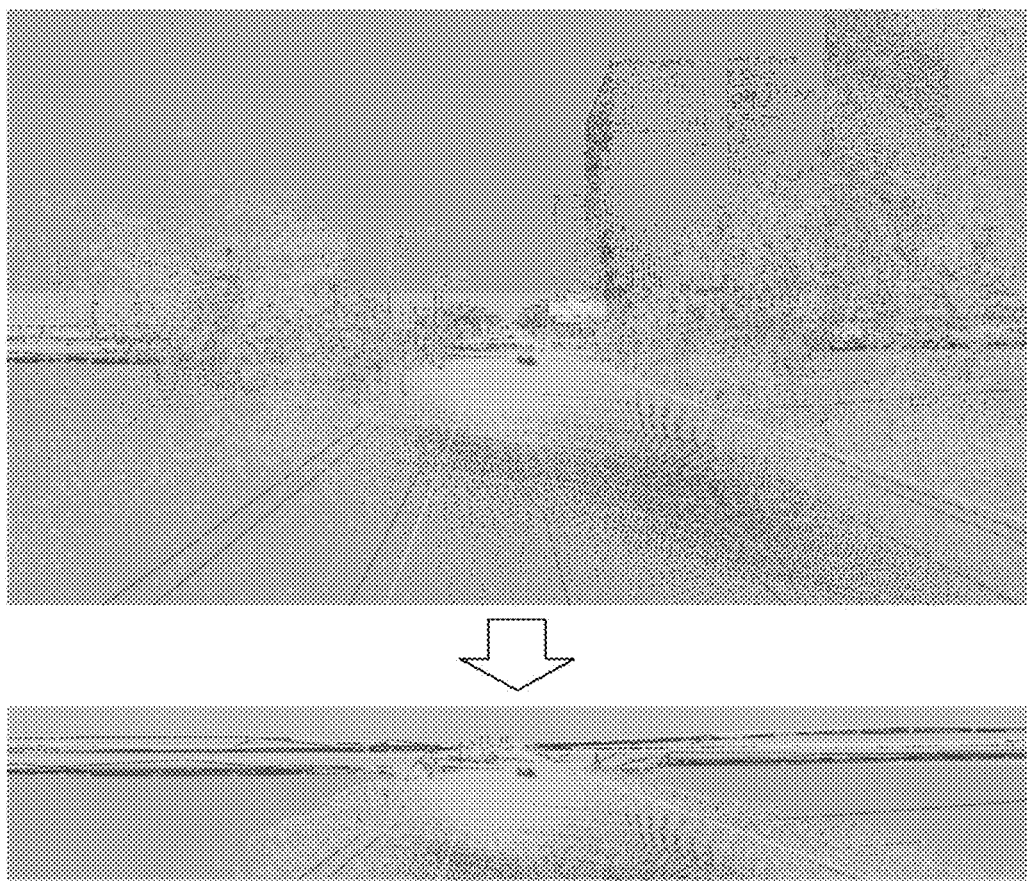
FIG. 7 is a view illustrating an example of filtering according to an exemplary embodiment of the present invention.

A result of this filtering will be described in more detail with reference to FIG. 7. FIG. 7 is a view illustrating an example of filtering according to an exemplary embodiment of the present invention. Referring to a drawing illustrated in an upper end of FIG. 7, the point cloud data acquired by the laser scanner of the mobile mapping system for a vehicle includes point cloud data on buildings, facilities, parked vehicles, moving vehicles, and the like, unrelated to road surface information as well as point cloud data on the road, such that difficult filtering technology for acquiring meaningful information is required.

However, according to the present invention described above, filtering is performed on a large amount of point cloud data obtained through the mobile mapping system for a vehicle in consideration of the view height of the laser scanner and the gradient of the road surface, thereby making it possible to effectively extract only point cloud data required for generating a three-dimensional road surface among the large amount of point cloud data, as illustrated in a drawing illustrated in a lower end of FIG. 7. That is, according to the present invention described above, the filtering is performed so that operation environments (the gradient of the road surface, the view height of the laser scanner, and the like) at the time of performing the operation using the mobile mapping system are reflected at the maximum, thereby making it possible to significantly improve an automatic filtering method.

Meanwhile, the road surface generating unit 120 may generate the road surface on the basis of the extracted point cloud data. In detail, the road surface generating unit 120 may generate a two-dimensional road surface vector using the extracted point cloud data, generate a three-dimensional road surface raster using the extracted point cloud data, and generate a three-dimensional road surface vector by combining the generated two-dimensional road surface vector and the generated three-dimensional road surface raster with each other. Such a road surface generating unit 120 may include all or some of a two-dimensional road surface vector generating unit 121, a three-dimensional road surface raster generating unit 122, and a combining unit 123. This will be described in detail with reference to FIGS. 8 to 10.

Figure 8:
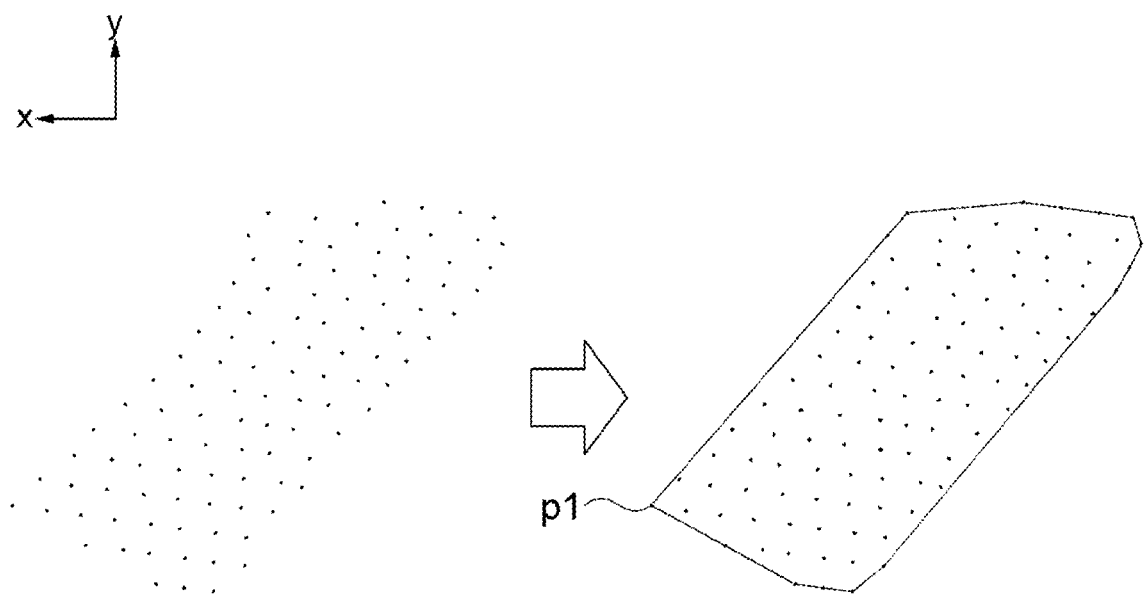
FIG. 8 is a conceptual diagram illustrating a process of generating a two-dimensional road surface vector according to an exemplary embodiment of the present invention.

FIG. 8 is a conceptual diagram illustrating a process of generating a two-dimensional road surface vector according to an exemplary embodiment of the present invention. The point cloud data extracted in the point cloud data processing unit 110 may have a three-dimensional space coordinate (that is, x, y, and z information of the real world). The point cloud data may be arranged in a two-dimensional plane of x and y as illustrated in the left drawing of FIG. 8.

In this case, the two-dimensional road surface vector generating unit 121 may apply a convex hull algorithm to x and y coordinate values of the point cloud data extracted in the point cloud data processing unit 110 to generate a two-dimensional road surface vector as illustrated in the right drawing of FIG. 8.

In detail, the two-dimensional road surface vector generating unit 121 may calculate angles of the respective points from a reference point p1 to extract the outermost points of the road surface, and connect the extracted outermost points of the road surface to one another to generate the two-dimensional road surface vector. In addition, the two-dimensional road surface vector generating unit 121 may combine a plurality of two-dimensional road surface vectors with one another to generate a final two-dimensional road surface vector.

Figure 9:
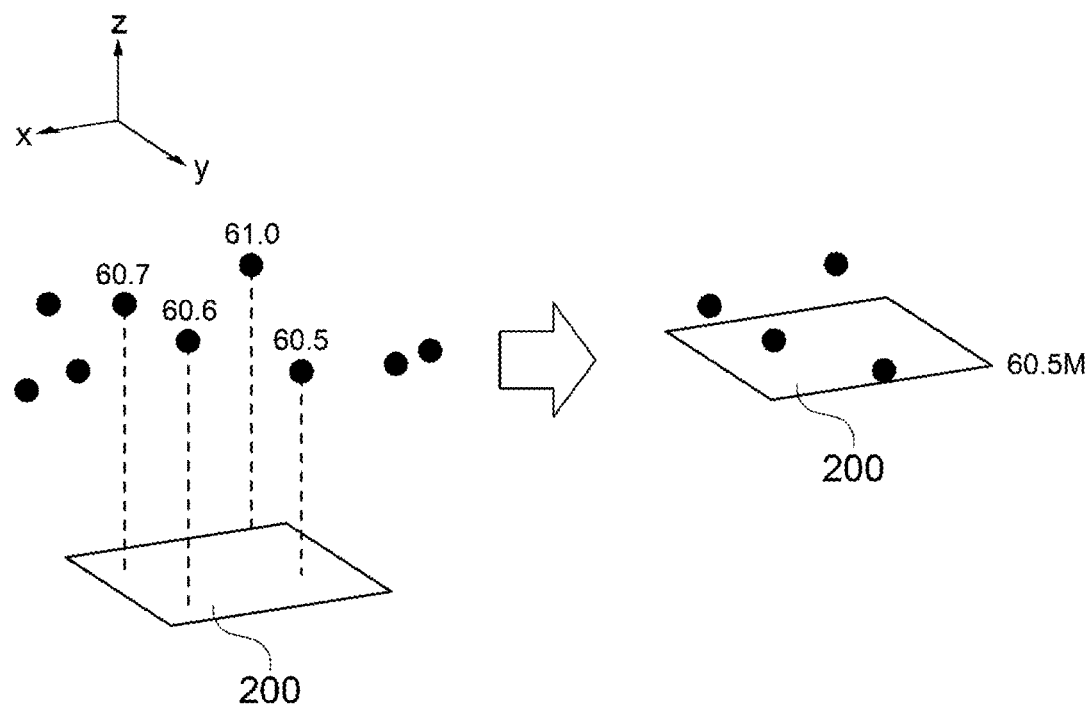
FIG. 9 is a conceptual diagram illustrating a process of generating a three-dimensional road surface raster according to an exemplary embodiment of the present invention.

FIG. 9 is a conceptual diagram illustrating a process of generating a three-dimensional road surface raster according to an exemplary embodiment of the present invention. Referring to FIG. 9, the point cloud data extracted in the point cloud data processing unit 110 may have a three-dimensional space coordinate (that is, x, y, and z information of the real world). The point cloud data may be arranged in a three-dimensional space of x, y, and z as illustrated in the left drawing of FIG. 9. In addition, the three-dimensional road surface raster generating unit 122 may generate a three-dimension road surface raster for each of a plurality of windows 200 having a determined size.

In addition, as illustrated in the right drawing of FIG. 9, the three-dimensional road surface raster generating unit 122 may generate a three-dimension road surface raster on the basis of a minimum height value (60.5 M) of point cloud data in the window 200.

Figure 10:
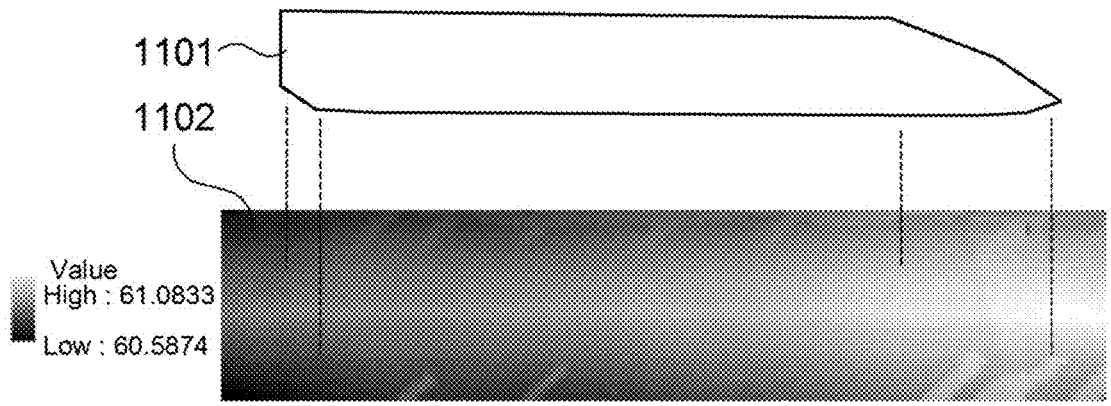
FIG. 10 is a conceptual diagram illustrating a process of generating a three-dimensional road surface according to an exemplary embodiment of the present invention.

In this case, the generated three-dimensional road surface raster may be represented by 1102 of FIG. 10.

Meanwhile, the three-dimensional road surface raster generating unit 122 may perform the above-mentioned operation on each of the plurality of windows 200 to generate a final three-dimension road surface raster.

FIG. 10 is a conceptual diagram illustrating a process of generating a three-dimensional road surface according to an exemplary embodiment of the present invention. Referring to FIG. 10, the combining unit 123 may combine a two-dimensional road surface vector 1101 generated in the two-dimensional road surface vector generating unit 121 and a three-dimensional road surface raster 1102 generated in the three-dimensional road surface raster generating unit 122 with each other to generate a three-dimensional road surface vector.

According to the present invention described above, the filtering is performed so that operation environments (the gradient of the road surface, the view height of the laser scanner, and the like) at the time of performing the operation using the mobile mapping system are reflected at the maximum, thereby making it possible to significantly improve an automatic filtering method and facilitate automatic generation of the three-dimensional road surface fundamental to the detailed map.

Meanwhile, each of the apparatus 110 for processing point cloud data and the apparatus 100 for generating a road surface described above may be implemented using software, hardware, or a combination thereof. As an example, according to a hardware implementation, each of the apparatus 110 for processing point cloud data and the apparatus 100 for generating a road surface may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions.

In addition, each of the apparatus 110 for processing point cloud data and the apparatus 100 for generating a road surface may be installed as one module in the mobile mapping system. In this case, the mobile mapping system may perform a function of each of the apparatus 110 for processing point cloud data and the apparatus 100 for generating a road surface in real time. In detail, the apparatus 110 for processing point cloud data may perform the filtering on the point cloud data obtained through the mobile mapping system in real time in consideration of the view height of the laser scanner 21 and the gradient of the road surface. In addition, the apparatus 100 for generating a road surface may perform the filtering on the point cloud data obtained through the mobile mapping system in real time in consideration of the view height of the laser scanner and the gradient of the road surface, and generate the road surface on the basis of the point cloud data extracted depending on the filtering in real time.

Operations of the apparatus 110 for processing point cloud data and a control flow of the apparatus 100 for generating a road surface will be described in more detail with reference to the drawings.

Figure 11:
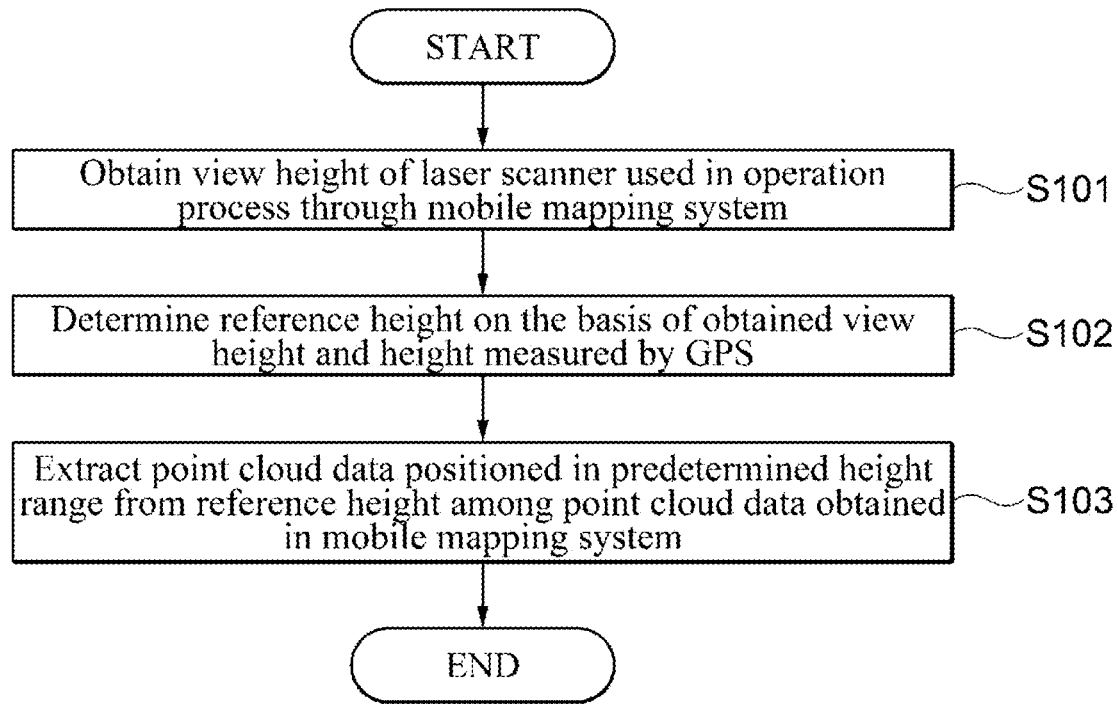
FIG. 11 is a flow chart illustrating a method for processing point cloud data according to an exemplary embodiment of the present invention.

FIG. 11 is a flow chart illustrating a method for processing point cloud data according to an exemplary embodiment of the present invention. Referring to FIG. 11, the apparatus 110 for processing point cloud data may first obtain a view height of a laser scanner used in an operation process through a mobile mapping system (MMS) (S101). Here, the view height of the laser scanner may be a value obtained by adding up a height of a moving object in which the mobile mapping system is installed and a height of the laser scanner.

In addition, in the process (S101) of obtaining the view height of the laser scanner, at least one of the height of the moving object in which the mobile mapping system is installed and the height of the laser scanner input from the user is received, such that the view height of the laser scanner may be obtained.

In addition, the process (S101) of obtaining the view height of the laser scanner may include a process of obtaining a GPS logarithm including GPS position information of the moving object used in the operation process through the mobile mapping system.

Meanwhile, the apparatus 110 for processing point cloud data may determine a reference height on the basis of the obtained view height and a height measured by the global positioning system (GPS) (S102). Here, in the process (S102) of determining the reference height, the reference height may be determined on the basis of a difference between the obtained view height and a height measured on the basis of the GPS logarithm.

In addition, the apparatus 110 for processing point cloud data may extract point cloud data positioned in a predetermined height range from the determined reference height among the point cloud data obtained in the mobile mapping system (S103).

Figure 12:
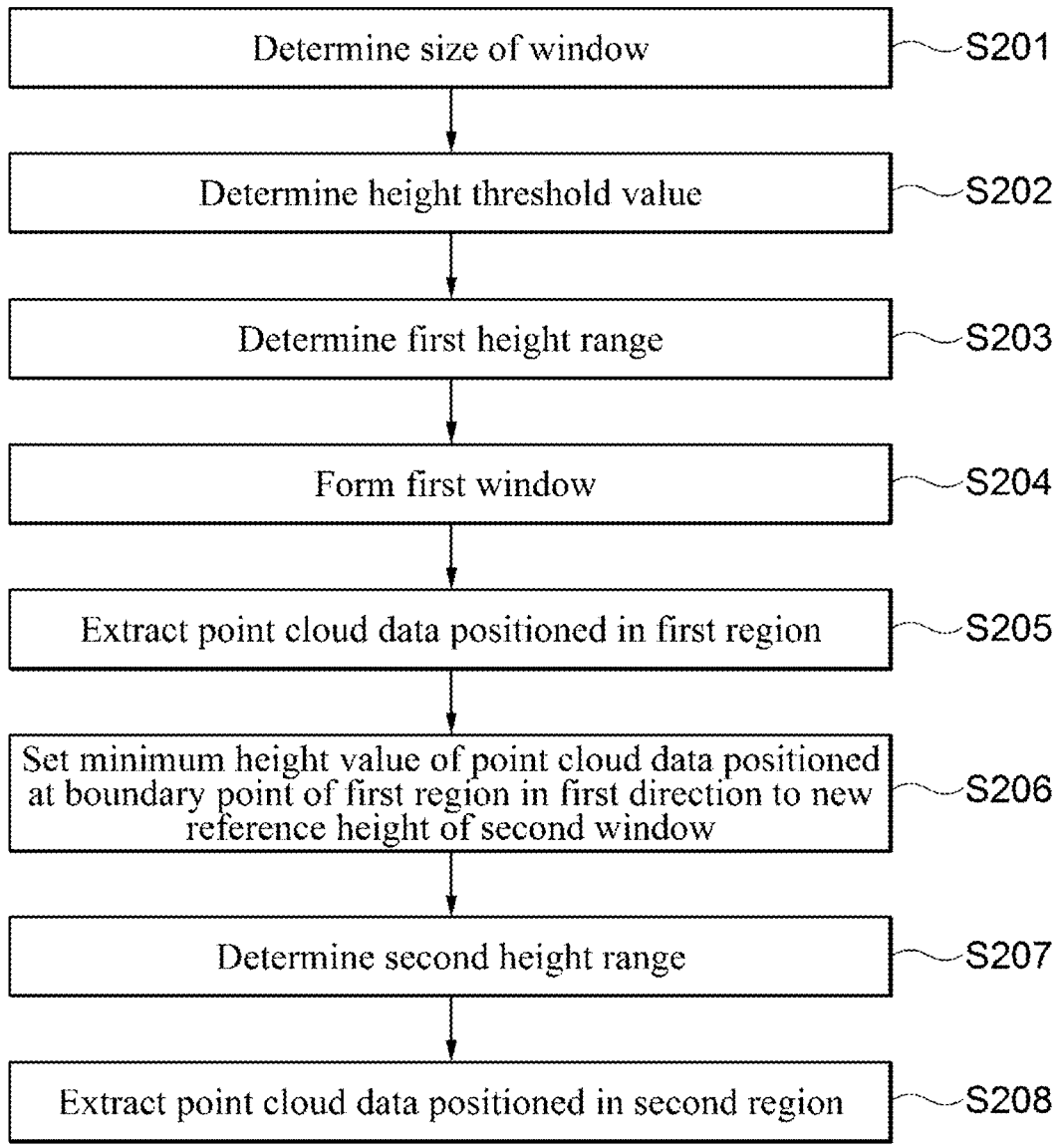
FIG. 12 is a flow chart illustrating a process (S103) of extracting point cloud data according to an exemplary embodiment of the present invention in more detail.

FIG. 12 is a flow chart illustrating a process (S103) of extracting point cloud data according to an exemplary embodiment of the present invention in more detail. Referring to FIG. 12, the apparatus 110 for processing point cloud data may determine a size of a window for filtering (S201). Here, in the process (S201) of determining the size of the window, the size of the window may be determined on the basis of an accuracy level that needs to be ensured in a detailed map.

In addition, the apparatus 110 for processing point cloud data may determine a height threshold value on the basis of the determined size of the window (S202). Here, in the process (S202) of determining the height threshold value, the height threshold value may be determined on the basis of a numerical value of a superelevation of the road and the size of the window.

In addition, the apparatus 110 for processing point cloud data may determine a first height range based on the reference height on the basis of the determined height threshold value (S203). Here, the predetermined height range may be a range between a value obtained by adding the height threshold value to the reference height $RP_h$ and a value obtained by subtracting the height threshold value from the reference height $RP_h$.

In addition, the apparatus 110 for processing point cloud data may form a first window having the determined size (S204).

In addition, the apparatus 110 for processing point cloud data may extract point cloud data positioned in a first region formed by the first window and the predetermined height range among the point cloud data obtained in the mobile mapping system (S205).

In addition, the apparatus 110 for processing point cloud data may set a minimum height value of point cloud data positioned at a boundary point of the first region in a first direction to a new reference height of a second window adjacent to the first window (S206). As an example, a minimum height value of the point cloud data positioned at the boundary point, in the first direction, of the first region formed by the first window may be set the new reference height for the second window adjacent to the first window. In addition, a minimum height value of point cloud data positioned at a boundary point, in a second direction, of the first region formed by the first window may be set a new reference height for the third window adjacent to the first window.

In addition, the apparatus 110 for processing point cloud data may determine a second height range based on the new reference height on the basis of the determined height threshold value (S207).

In addition, the apparatus 110 for processing point cloud data may extract point cloud data positioned in a second region formed by the second window and the predetermined height range among the point cloud data obtained in the mobile mapping system (S208).

Meanwhile, the apparatus 110 for processing point cloud data may extract point cloud data positioned in each of the plurality of regions. Therefore, point cloud data of the entire road region positioned in the width of the road may be extracted on the basis of a first position of the moving object 10.

In addition, when the extraction of the point cloud data of the entire road region positioned in the width of the road on the basis of the first position of the moving object is completed, the apparatus 110 for processing point cloud data processing may sequentially extract point cloud data of the entire road region positioned in the width of the road on the basis of a position of the moving object in the next time unit.

Figure 13:
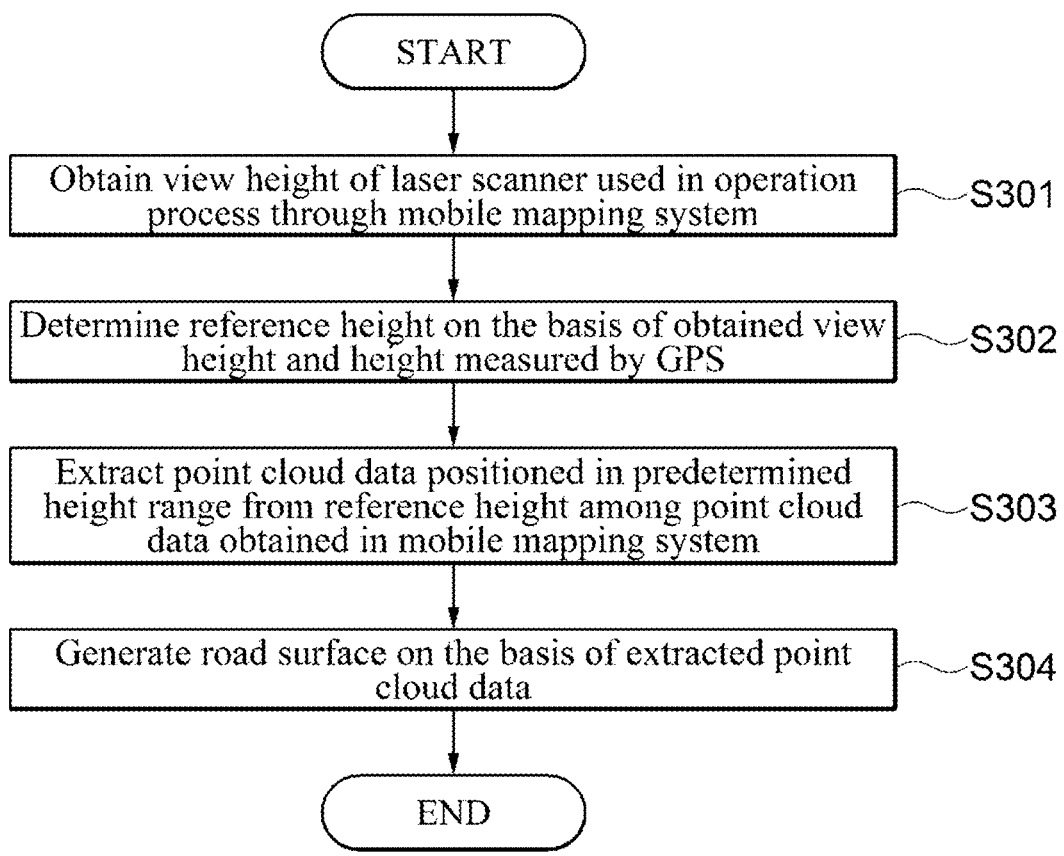
FIG. 13 is a flow chart illustrating a method for generating a road surface according to an exemplary embodiment of the present invention.

FIG. 13 is a flow chart illustrating a method for generating a road surface according to an exemplary embodiment of the present invention. Referring to FIG. 13, the apparatus 100 for generating a road surface may obtain a view height of a laser scanner used in an operation process through a mobile mapping system (MMS) (S301).

Meanwhile, the apparatus 100 for generating a road surface may determine a reference height on the basis of the obtained view height and a height measured by the global positioning system (GPS) (S302).

In addition, the apparatus 100 for generating a road surface may extract point cloud data positioned in a predetermined height range from the determined reference height among the point cloud data obtained in the mobile mapping system (S303).

Meanwhile, the apparatus 100 for generating a road surface may generate the road surface on the basis of the extracted point cloud data (S304).

Figure 14:
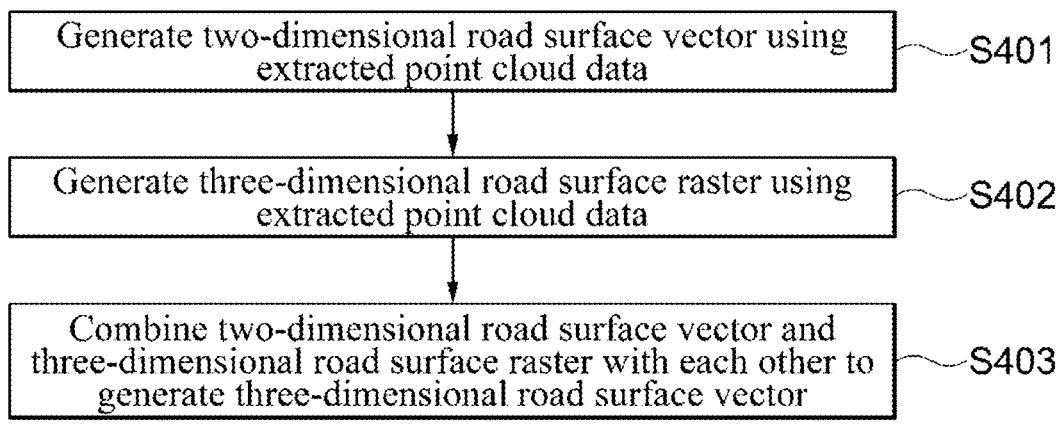
FIG. 14 is a flow chart illustrating a process (S304) of generating a road surface according to an exemplary embodiment of the present invention in more detail.

FIG. 14 is a flow chart illustrating a process (S304) of generating a road surface according to an exemplary embodiment of the present invention in more detail. Referring to FIG. 14, the apparatus 100 for generating a road surface may generate a two-dimensional road surface vector using the extracted point cloud data (S401). Here, in the process (S401) of generating the two-dimensional road surface vector, a convex hull algorithm may be applied to x and y values of the extracted point cloud data to generate the two-dimensional road surface vector.

In addition, the apparatus 100 for generating a road surface may generate a three-dimensional road surface raster using the extracted point cloud data (S402). Here, in the process (S402) of generating the three-dimensional road surface raster, the three-dimensional road surface raster may be generated on the basis of a minimum height value of point cloud data in a window.

In addition, the apparatus 100 for generating a road surface may combine the two-dimensional road surface vector and the three-dimensional road surface raster with each other to generate the three-dimensional road surface vector (S403).

According to the various exemplary embodiments of the present invention described above, the filtering is performed on the point cloud data in consideration of the view height of the laser scanner and the gradient of the road surface, thereby making it possible to effectively extract only point cloud data required for generating the three-dimensional road surface among a large amount of point cloud data.

That is, according to the related art, a method of using a fixed threshold value at the time of filtering point cloud data has been used. However, in such a method, inaccurate data was also acquired, such that a process of manually reprocessing the inaccurate data was required. However, according to the present invention described above, the filtering is performed so that operation environments (the gradient of the road surface, the view height of the laser scanner, and the like) at the time of performing the operation using the mobile mapping system are reflected at the maximum, thereby making it possible to significantly improve an automatic filtering method and facilitate automatic generation of the three-dimensional road surface fundamental to the detailed map.

Meanwhile, the methods according to the various exemplary embodiments of the present invention described above may be implemented in an installation data form and be provided in servers or devices in a state in which they are stored in various non-transitory computer readable media. Therefore, the respective apparatuses may access the servers or the devices in which the installation data are stored to download the installation data.

The non-transitory computer readable medium is not a medium that stores data therein for a while, such as a register, a cache, a memory, or the like, but means a medium that semi-permanently stores data therein and is readable by a device. In detail, various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

Although the exemplary embodiments of the present invention have been illustrated and described hereinabove, the present invention is not limited to the above-mentioned specific exemplary embodiments, but may be variously modified by those skilled in the art to which the present invention pertains without departing from the scope and spirit of the present invention as disclosed in the accompanying claims. These modifications should also be understood to fall within the scope of the present invention.

What is claimed is:

1. A method for generating a road surface computer model, the method comprising:
    obtaining a view height of a laser scanner used in an operation process of a mobile mapping system (MMS);
    determining a reference height on a basis of a difference between the obtained view height and a height measured by a global positioning system (GPS);
    extracting point cloud data positioned in a predetermined height range extended from the determined reference height from the point cloud data obtained in the mobile mapping system;
    generating a two-dimensional road surface vector using x and y values of the extracted point cloud data;
    generating a three-dimensional road surface raster on the basis of a minimum height value of the extracted point cloud data in a window;
    combining the two-dimensional road surface vector and the three-dimensional road surface raster with each other to generate a three-dimensional road surface vector; and
    generating the road surface computer model using the three-dimensional road surface vector.

2. The method of claim 1, wherein the view height of the laser scanner is a value obtained by adding up a height of a moving object in which the mobile mapping system is installed and a height of the laser scanner.

3. The method of claim 2, wherein the obtaining of the view height of the laser scanner includes receiving at least one of the height of the moving object in which the mobile mapping system is installed and the height of the laser scanner input from a user.

4. The method of claim 1, further comprising obtaining a GPS logarithm including GPS position information of a moving object used in the operation process through the mobile mapping system.

5. The method of claim 4, wherein in the determining of the reference height, the reference height is determined on the basis of a difference between the obtained view height and a height measured on the basis of the GPS logarithm.

6. The method of claim 5, wherein the extracting of the point cloud data includes:
    determining a size of a window for filtering the point cloud data;
    determining a height threshold value on the basis of the determined size of the window;
    determining a first height range based on the reference height on the basis of the determined height threshold value;
    forming a first window having the determined size; and
    extracting point cloud data positioned in a first region formed by the first window and the first height range among the point cloud data obtained in the mobile mapping system.

7. The method of claim 6, wherein in the determining of the size of the window, the size of the window is determined on the basis of an accuracy level that needs to be ensured in a detailed map.

8. The method of claim 6, wherein in the determining of the height threshold value, the height threshold value is determined on the basis of a numerical value of a superelevation of a road and the size of the window.

9. The method of claim 6, wherein the extracting of the point cloud data further includes:
setting a minimum height value of point cloud data positioned at a boundary point of the first region to a new reference height;
determining a second height range based on the new reference height on the basis of the determined height threshold value;
forming a second window in a direction perpendicular to a movement direction of the moving object on the basis of the first window; and
extracting point cloud data positioned in a second region formed by the second window and the second height range among the point cloud data obtained in the mobile mapping system.

10. The method of claim 1, wherein in the generating of the two-dimensional road surface vector, a convex hull algorithm is applied to the x and y values of the extracted point cloud data to generate the two-dimensional road surface vector.

11. An apparatus for generating a road surface computer model, the apparatus comprising a processor configured to:
obtain a view height of a laser scanner used in an operation process of a mobile mapping system (MMS);
determine a reference height on a basis of a difference between the obtained view height and a height measured by a global positioning system (GPS);
extract point cloud data positioned in a predetermined height range extended from the determined reference height from the point cloud data obtained in the mobile mapping system;
generate a two-dimensional road surface vector using x and y values of the extracted point cloud data;
generate a three-dimensional road surface raster on the basis of a minimum height value of the extracted point cloud data in a window;
combine the two-dimensional road surface vector and the three-dimensional road surface raster with each other to generate a three-dimensional road surface vector; and
generate the road surface computer model using the three-dimensional road surface vector.

12. The apparatus of claim 11, wherein the view height of the laser scanner is a value obtained by adding up a height of a moving object in which the mobile mapping system is installed and a height of the laser scanner.

13. The apparatus of claim 11, wherein the processor obtains a GPS logarithm including GPS position information of a moving object used in the operation process through the mobile mapping system.

14. The apparatus of claim 13, wherein the processor determines the reference height on the basis of a difference between the obtained view height and a height measured on the basis of the GPS logarithm.

15. The apparatus of claim 14, wherein the processor is further configured to:
determine a size of a window for filtering the point cloud data,
determine a height threshold value on the basis of the determined size of the window,
determine a first height range based on the reference height on the basis of the determined height threshold value,
form a first window having the determined size, and
extract point cloud data positioned in a first region formed by the first window and the first height range among the point cloud data obtained in the mobile mapping system.

16. The apparatus of claim 15, wherein the processor is further configured to:
set a minimum height value of point cloud data positioned at a boundary point of the first region to a new reference height,
determine a second height range based on the new reference height on the basis of the determined height threshold value,
form a second window in a direction perpendicular to a movement direction of the moving object on the basis of the first window, and
extract point cloud data positioned in a second region formed by the second window and the second height range among the point cloud data obtained in the mobile mapping system.

17. A non-transitory computer readable recording medium in which a program for executing a method for generating a road surface computer model is recorded, the method comprising:
obtaining a view height of a laser scanner used in an operation process of a mobile mapping system (MMS);
determining a reference height on a basis of a difference between the obtained view height and a height measured by a global positioning system (GPS);
extracting point cloud data positioned in a predetermined height range extender from the determined reference height from the point cloud data obtained in the mobile mapping system;
generating a two-dimensional road surface vector using x and y values of the extracted point cloud data;
generating a three-dimensional road surface raster on the basis of a minimum height value of the extracted point cloud data in a window;
combining the two-dimensional road surface vector and the three-dimensional road surface raster with each other to generate a three-dimensional road surface vector; and
generating the road surface computer model using the three-dimensional road surface vector.

* * * * *